B. R. HALL.
SHAFT BEARING.
APPLICATION FILED APR. 11, 1913.
1,089,701.
Patented Mar. 10, 1914.
2 SHEETS—SHEET 1.
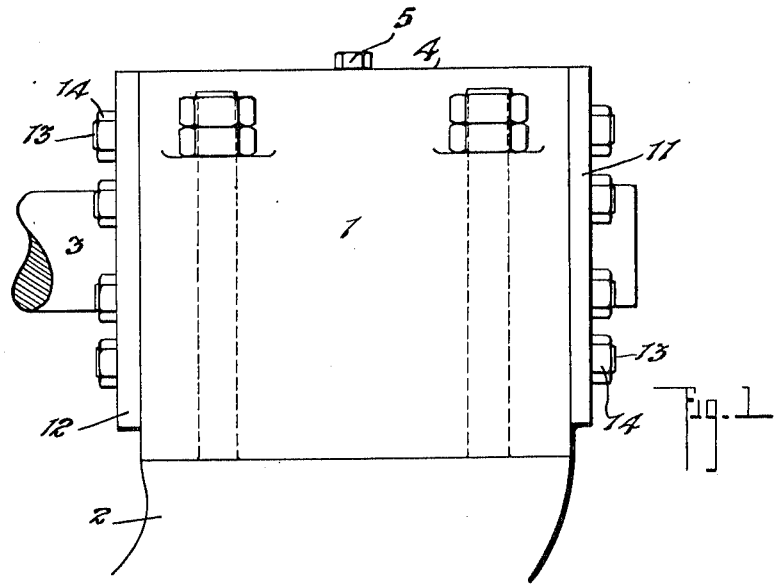
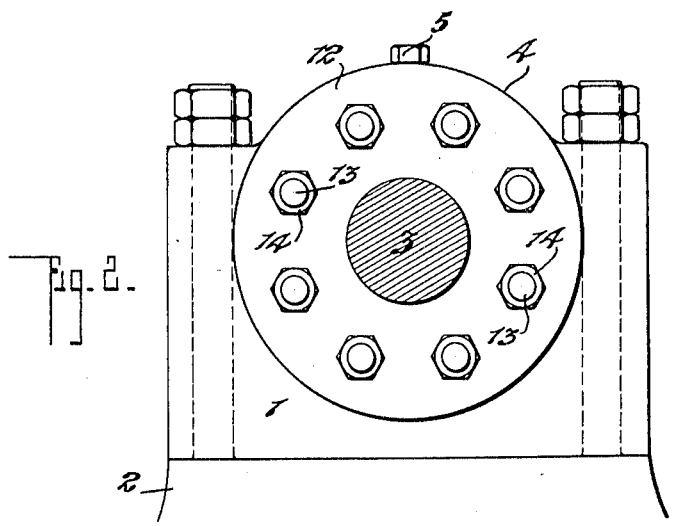
Witnesses
J. S. Roxburgh
Roland Foster
Inventor.
B. R. Hall
by
Fred B. Fahnestock
Atty.
COLUMBIA PLANOGRAPH CO., WASHINGTON, D. C.

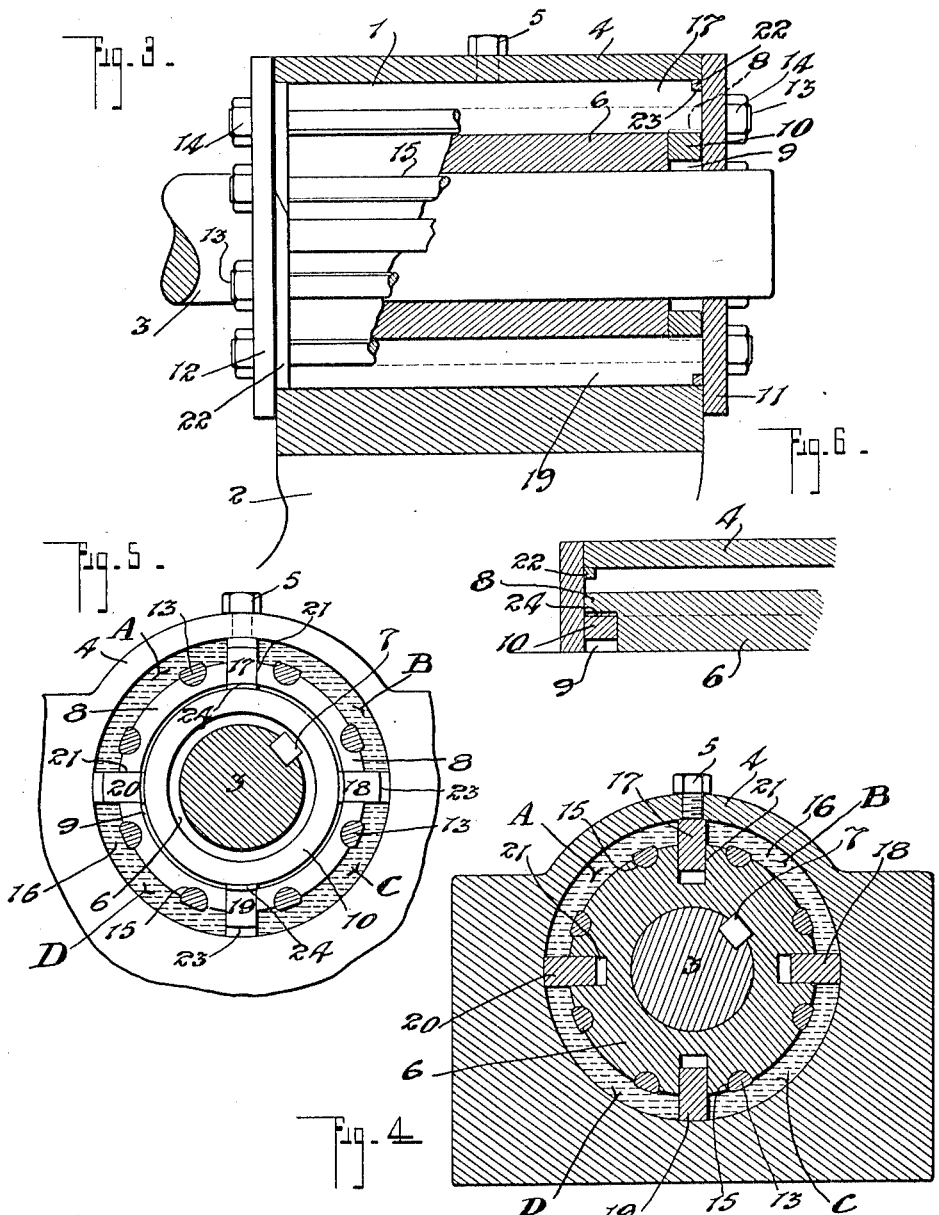

UNITED STATES PATENT OFFICE.

BERTIE RAY HALL, OF OUTLOOK, SASKATCHEWAN, CANADA.

SHAFT-BEARING.

1,089,701. Specification of Letters Patent. Patented Mar. 10, 1914.

Application filed April 11, 1913. Serial No. 760,487.

*To all whom it may concern:*

Be it known that I, BERTIE RAY HALL, of the town of Outlook, in the Province of Saskatchewan, Canada, have invented certain new and useful Improvements in Shaft-Bearings, of which the following is the specification.

The invention relates to a bearing for shafts and other rotating members and the object of the invention is to provide an inexpensive and durable bearing in which the friction between the moving part such as the shaft and the stationary part, the bearing, has been reduced to a minimum, the shaft actually rotating for a greater part in an oil well, the oil supporting and taking the lateral thrusts to which the shift is subjected.

With the above object in view the invention consists essentially in a hollow cylindrical casing, heads located at the ends of the casing, a sleeve located within the casing and secured to the heads and provided with extending flanges forming end pockets, said heads, cylinder and sleeve inclosing an oil well, a shaft fixed to the sleeve and passing through the heads, spacing rings located in the pockets and free of the shaft and flanges, longitudinally disposed dividing bars mounted slidably in respect to the sleeve and having the ends thereof bearing on the rings, said dividing bars extending into the well and engaging the inner face of the cylinder and split rings inserted within the ends of the casing, the parts being arranged and constructed as hereinafter more particularly described and later pointed out in the appended claim.

Figure 1 represents a side view of my complete shaft bearing. Fig. 2 represents an end view of the same. Fig. 3 represents a longitudinal sectional view centrally through the bearing, certain parts being shown in side elevation. Fig. 4 represents a vertical cross sectional view centrally through the bearing. Fig. 5 represents an end view of the bearing with one of the heads and the split ring removed. Fig. 6 represents a detailed vertical sectional view through a portion of the casing, sleeve and one of the heads.

In the drawings like characters of reference indicate corresponding parts in each figure.

1 represents my bearing which is carried by any suitable permanent structure 2 and receives the shaft 3.

The bearing is now described in detail:

4 represents an open ended cylinder supplied with a suitably located screw threaded filling plug 5.

6 is a sleeve permanently fastened to the shaft in any suitable way such as by a key 7. The sleeve has the ends thereof supplied with extending end flanges 8 which provide annular end pockets 9 for the reception of spacing rings 10, which rings are designed so that when inserted they are both free of the shaft and also free of the flanges. The sleeve with the flanges is of the same length as the cylinder and its diameter is considerably less than the inner diameter of the cylinder whereby a space is reserved between the face of the sleeve and the inner face of the cylinder.

11 and 12 are heads mounted on the shaft and closing the ends of the cylinder. These heads are permanently fastened to the sleeve by longitudinally disposed bolts 13 fitted with nuts 14. It will be noticed that the bodies of the bolts lie in longitudinally extending grooves 15 formed in the face of the sleeve and also that the bodies of the bolts extending from the grooves are partially cut away. This latter feature is more or less unimportant as I have only done it to increase the capacity of the oil well 16 reserved between the sleeve, the cylinder and the heads.

17, 18, 19 and 20 are similar longitudinally disposed dividing bars contained within the casing and between the heads and having their ends bearing on the spacing rings 10. These bars it will be noticed are slidably received within longitudinally disposed grooves 21 passing lengthwise of the sleeve and divide the oil well in the present instance into four compartments A, B, C and D. Owing to their mounting they are compelled to rotate with the sleeve but the sleeve is free to move radially, sliding in respect to the bars.

22 are split rings inserted within the ends of the cylinder and bearing against the cylinder and the adjoining faces of the heads. The outer corners of the dividing bars are notched at 23 to admit the rings.

The various compartments of the oil well are filled with oil inserted by removing the plug 5 and forcing the oil in under pressure, the shaft being rotated during this operation to allow each compartment to be filled in order. I have stated that the oil is forced in but this is only done to insure that each compartment is thoroughly filled. When this is accomplished the bearing is ready for use.

It will be seen that the sleeve is mounted in oil so that the shaft will rotate very freely. The dividing bars prevent the oil from escaping from pocket to pocket with the result that the lateral stresses of the shaft when in use are taken up by the oil in the compartments on the side remote from the side on which the stress is applied. The spacing rings hold the stop bars continuously against the inner face of the cylinder and prevent any possibility of the oil escaping from one compartment to the other. In this connection I may state that a leather or such like packing 24 is inserted between the spacing rings and the adjoining ends of the bars. The sliding connection between the sleeve and the bars allows for any slight compression of the oil which might occur when operating under heavy strains. The spacing bars must not at any time pass away from the inner face of the casing as this would allow the oil to escape from one compartment to another and the invention would then fail in its object. The split rings are provided to prevent oil escaping between the heads and the cylinder.

What I claim as my invention is:

The combination comprising a casing, a shaft passing through the casing, there being a space reserved between the shaft and the casing, heads rotatable with the shaft and closing the ends of the casing, a sleeve mounted on the shaft and rotatable therewith, said sleeve having longitudinally extending grooves formed therein, bolts fitting in said grooves connecting the heads, dividing bars extending between the sleeve and the casing and dividing the space aforesaid into a number of independent compartments, the said dividing bars being rotatable with the sleeve but slidably mounted within and filling the compartments, as and for the purpose specified.

Signed at Outlook, Sask., this 3rd day of March, 1913.

BERTIE RAY HALL.

In the presence of—
GLADYS NELSON,
N. ARTEEN ROKWORTH.

Copies of this patent may be obtained for five cents each, by addressing the "Commissioner of Patents, Washington, D. C."